US010572615B2

(12) United States Patent
Moroz

(10) Patent No.: US 10,572,615 B2
(45) Date of Patent: Feb. 25, 2020

(54) PLACEMENT AND ROUTING OF CELLS USING CELL-LEVEL LAYOUT-DEPENDENT STRESS EFFECTS

(71) Applicant: SYNOPSYS, INC., Mountain View, CA (US)

(72) Inventor: Victor Moroz, Saratoga, CA (US)

(73) Assignee: SYNOPSYS, INC., Mountain View, CA (US)

(*) Notice: Subject to any disclaimer, the term of this patent is extended or adjusted under 35 U.S.C. 154(b) by 114 days.

(21) Appl. No.: 15/962,277

(22) Filed: Apr. 25, 2018

(65) Prior Publication Data
US 2018/0314783 A1 Nov. 1, 2018

Related U.S. Application Data

(60) Provisional application No. 62/491,704, filed on Apr. 28, 2017, provisional application No. 62/515,642, filed on Jun. 6, 2017.

(51) Int. Cl.
H02J 7/00 (2006.01)
G06F 17/50 (2006.01)

(52) U.S. Cl.
CPC ...... *G06F 17/5036* (2013.01); *G06F 17/5081* (2013.01)

(58) Field of Classification Search
USPC ................................. 320/107, 108, 109, 110
See application file for complete search history.

(56) References Cited

U.S. PATENT DOCUMENTS

| 5,461,576 A | 10/1995 | Tsay et al. |
| 8,176,444 B2 | 5/2012 | Banerjee et al. |
| 8,407,634 B1 | 3/2013 | Moroz et al. |
| 8,621,409 B2 | 12/2013 | Lee et al. |
| 8,959,472 B1 | 2/2015 | Frederick, Jr. et al. |

(Continued)

FOREIGN PATENT DOCUMENTS

WO 2015200343 A1 12/2015

OTHER PUBLICATIONS

PCT/US2018/029895—International Search Report and Written Opinion dated Sep. 3, 2018, 14 pages.

(Continued)

*Primary Examiner* — Brian Ngo
(74) *Attorney, Agent, or Firm* — Haynes Beffel & Wolfeld LLP

(57) ABSTRACT

Disclosed is technology for placing cells in a circuit design layout to thereby improve the operation of place- and route equipment used for fabrication of an integrated circuit. The target cells are chosen from a cell library which includes descriptions for a plurality of cells, and information about dependency of each cell on hypothetical boundary conditions that can be imposed on the cell by any stress source originating in the vicinity of said cell in the layout. In order to select a cell for a target location in the layout, boundary conditions imposed on the target position by each of the cells neighboring the target position are determined. The system then selects an appropriate target cell in dependence upon the determined boundary conditions and the performance of the cell based on the boundary conditions imposed on the cell by the neighboring cells from the cell library.

34 Claims, 10 Drawing Sheets

(56) References Cited

U.S. PATENT DOCUMENTS

| | | | |
|---|---|---|---|
| 2003/0073896 A1* | 4/2003 | Zuzan | G06K 9/00 |
| | | | 600/407 |
| 2007/0234266 A1* | 10/2007 | Chen | G06F 17/5054 |
| | | | 716/113 |
| 2009/0024973 A1 | 1/2009 | Yamada | |
| 2010/0275167 A1* | 10/2010 | Fu | G06F 17/5072 |
| | | | 716/132 |
| 2011/0084312 A1* | 4/2011 | Quandt | H01L 27/0207 |
| | | | 257/202 |
| 2011/0145775 A1 | 6/2011 | Sano | |
| 2011/0145776 A1 | 6/2011 | Rohe et al. | |
| 2012/0286331 A1* | 11/2012 | Aton | H01L 27/0207 |
| | | | 257/202 |
| 2013/0332893 A1 | 12/2013 | Lin et al. | |
| 2014/0130003 A1* | 5/2014 | Cheuh | G06F 17/5072 |
| | | | 716/121 |
| 2017/0161425 A1 | 6/2017 | DeHond et al. | |
| 2017/0358565 A1* | 12/2017 | Hensel | H01L 27/0207 |

OTHER PUBLICATIONS

Lin et al., "Layout proximity effects and modeling alternatives for IC designs," IEEE Design & Test of Computers 27, No. 2 (2010), pp. 18-24.

Clark et al., "ASAP7: A 7-nm finFET predictive process design kit," Microelectronics Journal 53 (2016): pp. 105-115.

* cited by examiner

| CELL LOGIC FUNCTION | CELL ID | CELL LAYOUT | BOUNDARY CONDITIONS | RESULTING PERFORMANCE PARAMETERS | BOUNDARY CONDITIONS IMPOSED ON OTHER CELLS |
|---|---|---|---|---|---|
| A | A1 | | BC1<br>BC2<br>BC3<br>.<br>.<br>. | P1<br>P2<br>P3<br>.<br>.<br>. | to the North, South, East and West |
| | A2 | | | | |
| | A3 | | | | |
| | A4 | | | | |
| B | B1 | | | | |
| | B2 | | | | |
| | B3 | | | | |

FIG. 3

PLACEMENT AND ROUTING OF CELLS USING CELL-LEVEL LAYOUT-DEPENDENT STRESS EFFECTS

CROSS-REFERENCE TO OTHER APPLICATIONS

This application claims priority under 35 U.S.C. § 119(e) to U.S. Provisional Application No. 62/491,704 filed on Apr. 28, 2017 and U.S. Provisional Application No. 62/515,642 filed on Jun. 6, 2017, both of which are incorporated by reference herein in their entirety.

The following U.S. patents and patent applications are incorporated by reference herein for all of their teachings: U.S. patent application Ser. No. 15/901,749, filed Feb. 21, 2018, entitled Automated Resistance and Capacitance Extraction and Netlist Generation of Logic Cells; U.S. Pat. No. 8,407,634, issued Mar. 26, 2013, entitled Analysis Of Stress Impact On Transistor Performance; and Tsay U.S. Pat. No. 5,461,576, issued Oct. 24, 1995.

FIELD OF THE INVENTION

This invention relates to the improvements in integrated circuit manufacture, and more particularly to improving the operation of placement and routing facilities for integrated circuit designs so that better integrated circuit devices can be manufactured for a given circuit design

BACKGROUND

An integrated circuit (IC) is a set of electronic circuits that integrates a large number of semiconducting transistors into a small chip. Among the most advanced integrated circuits are microprocessors, memory chips, programmable logic sensors, power management circuits, etc. Advances in IC technology have led to size reduction of transistors, enabling greater densities of devices and circuits in IC chips and enhanced performance. Over the years, because of the ever-increasing complexity of IC designs, IC designers have become more and more reliant on electronic design automation (EDA) tools to assist them in designing ICs. Assistance from the EDA tools spans the entire design process, from synthesis, placement, routing, to layout verification.

A common method of designing an IC requires that an IC designer first have a library of circuit cells and a design describing the functionality of the integrated circuit. The cells may implement fundamental logical functions such as OR, NAND, NOR, AND, XOR, inverter. The cells may also include sequential circuit elements such as latches and flip-flops for memory requirements. The library of circuit cells may be provided by a fabrication vendor and are specific to the vendor's fabrication process technology. For most cell functions, the library offers a number of different cells optimized for different purposes.

Placement and routing is a stage in the design of ICs that involves two steps. The first step, placement, involves deciding where to place the cells in an IC layout that has a limited amount of space. The selection of cell placement is usually made on the basis of factors such as minimum and maximum setup and hold times, cell power consumption, size of the cells, routing and interconnect delays between different cells, and leakage current. It is an iterative process to select cells that optimize over an entire module or chip. The placement step is followed by routing, which decides the exact design of all the wires needed to connect the placed cells in the layout. The routing step implements all the desired connections while following the rules and limitations of the manufacturing process. The final product of the two steps process is a final layout, a geometric description of the shapes in and the location of each cell, and the exact path of each wire connecting them.

In earlier technologies, transistor sizes were large enough that their electrical behavior was independent of their locations in the final layout. However, in highly scaled technologies with smaller geometries, the electrical performance of a transistor has become increasingly dependent (~40-50% more dependent) on its location in the layout. Intentional stresses and unintentional stresses in the layout, as well as unwanted variations in intentional stresses, affect the electrical properties of the transistor due to electronic band deformation of various materials used in integrated circuits and change in electron and hole mobility in transistors. Thus, it becomes imperative to consider the contributions of various intentional and unintentional stress generation mechanisms near a transistor to analyze its performance accurately. As used herein, a "stress generation mechanism" is one that may cause stress variations within one cell and in other cells.

Examples of intentional stress generation mechanisms which improve mobility of electrons and holes include source/drain regions with alloys that have a bigger lattice constant than silicon, dielectric nitride films with intrinsic compressive or tensile stress grown over a transistor region, deposition and removal of sacrificial polysilicon gates and subsequent metal gate deposition, stress incorporated in the metal contacts over source/drain regions, etc. Due to process variation during IC manufacturing, there may be variations in intentional stress generation mechanisms in the IC.

In addition to variations in intentional stress generation mechanisms, unintentional stress generation mechanisms in the layout also interfere with the engineered intrinsic stress and cause placement-dependent electrical parameter variations in the final IC. The unintentional stress generation mechanisms can mainly be attributed to the thermal mismatch of various materials used during IC manufacturing. Major sources of unintentional stress that lie in proximity of the transistors in integrated circuits are shallow-trench isolation or STI (used to isolate transistors in the layout), through-silicon-vias or TSVs (used for making vertical interconnections between stacked ICs), mismatch between package substrate and silicon die, "cutting" of fins in FinFETs to break long fins into individual pairs or to create an isolated fin, fin edge effects in FinFETs, etc.

Intentional and unintentional stress generation mechanisms significantly affect design methodologies in modern integrated circuits, which are built from a pre-characterized library of cells. These cells may be instantiated multiple times in different parts of the final layout, where they experience different stress variations. Stress effects in a layout are relatively complex because of directional dependency, variation in material sources, and sensitivity to the placement of cells. Each layout feature in a cell, such as the edges or corners of various parts of the transistors in the cell, STI or TSVs, contributes to stress variation with an interaction range of up to 2 microns. Therefore, a stress generation mechanism in a first cell can contribute to stress variation in other cells in the layout in the vicinity (~2 microns) of the first cell. Performance of the first cell at a certain placement in a layout is not only dependent on the internal stress generation mechanisms within the first cell but also on external stress generation mechanisms in neighboring cells. Similarly, the performances of neighboring cells are also affected by the internal stress generation mechanisms of the first cell. It may well be, for example, that a cell chosen for a particular function for insertion into a particular position in a layout, has its performance changed so substantially due to stresses imposed by neighboring cells, that the chosen cell may actually be the wrong cell for the particular function.

In the above-incorporated U.S. patent application Ser. No. 15/901,749, filed Feb. 21, 2018, entitled Automated Resistance And Capacitance Extraction And Netlist Generation Of Logic Cells, a Design-Technology Co-Optimization technique is described with a goal of developing a Power-Performance-Area evaluation of a library cell based on its GDS layout and process flow. Realistic parasitic RC values are extracted for the specific 3D structure of a library cell, including lithography and etch micro-loading effects, and the cell is characterized using a circuit simulator such as HSPICE. However, BSIM compact SPICE models are extracted for a nominal transistor only, which does not account for stress, lithography, etch micro-loading and other cell proximity effects that can contribute as much as 30% or more to cell performance variations.

In the past, in order to account for cell layout proximity effects in the evaluation of cell performance, it was typical to use a Design Rule Check tool (like ICV (Integrated Circuit Validator) from Synopsys) to measure several hundred distances from each transistor of the cell to its neighbors. These distances were used in look up tables to determine modifications of the nominal BSIM parameters for each specific transistor in the circuit, such as a shift in Vt (threshold voltage) or change in mobility. This methodology required a huge effort, including thousands of test structures that try to mimic all possible layout configurations, and including calibration of an appropriate set of look-up tables and implementing look-up table evaluation into circuit analysis tools like HSPICE. The difficulty in making this approach work again limits its availability to only in the later stages of technology development as part of a mature Process Design Kit (PDK). It is not available in the early stages of technology development, where a DTCO tool flow provides co-optimization of technology and design.

SUMMARY

Roughly described, a system and method are provided that can be used for selecting a target cell to be placed in a target location in a target circuit design layout. The target circuit design will then be used for fabrication of an integrated circuit. A cell library including a plurality of cells is provided to the system. Each cell in the plurality of cells includes the cell layout of at least one transistor, at least one interconnect, and at least one pin. For each cell in the cell library, the cell library indicates performance parameters for a plurality of sets of hypothetical boundary conditions of the cell. Each set of hypothetical boundary conditions imposed on a certain cell by neighboring cells includes the effects of any intentional or unintentional stress generation mechanisms originating in the neighboring cell that may contribute to any stress variation in said cell.

In order to produce a target circuit design layout, the system selects a target cell from the cell library in dependence upon a provided circuit design to be placed into a target position in the layout. That is, given the function required by the circuit design for the target position, the system selects a cell from the cell library that performs that function. The target position has one or more neighboring cells in its vicinity in the target circuit design layout. Selection of the target cell is performed by the system by determining from the layout, boundary conditions imposed on the target position by each of the cells neighboring the target position. The system then selects an optimal target cell from the cell library in dependence upon the determined boundary conditions of the neighboring cells and the performance of the cell based on the boundary conditions imposed on the cell by the neighboring cells. In one embodiment, the system may select the target cell from the cell library taking into consideration additional factors, such as cell power consumption, size of the cells, routing and interconnect delays, etc. After selection, the system places the target cell into the target position in the target circuit design layout. In one embodiment, the selected target cell may impose boundary conditions on a first neighboring cell of the target position in the target circuit design layout, and the first neighboring cell may be replaced with a second neighboring cell in dependence upon the boundary conditions imposed by the target cell on the first neighboring cell.

The disclosed invention reduces the number of physical test fabrications required (~30-40% reduction) to optimize newly designed IC, thereby drastically reducing cost and time required for a new IC technology to be ready for full-scale production and sale.

The cells in the library are pre-annotated with performance information as a function of boundary conditions imposed from neighboring cells. For example, multiple sets of hypothetical boundary conditions may be identified in the cell, and for each one, the cell provides an indication of its resulting performance. In one embodiment, this information can be evaluated by actually fabricating each of the library cells on a wafer, in multiple instances each with a different experimental set of neighboring cells bordering it. The performance of the cell is then tested and the library cell is annotated with the results. One problem with this approach is that it is expensive to fabricate such a wafer, and difficult to determine exactly what stresses are applied to a cell by its neighbors for purposes of generalizing the performance variations to cover other combinations of neighboring cells that are not actually on the test wafer. Also, it is desirable that each cell also identify the boundary conditions that the cell imposes on its neighbors, for use when a cell is the neighboring cell of a target position. As mentioned, it is difficult to determine from a fabricated cell what stresses and other boundary conditions it would impose on its neighbors.

Another very significant problem with a physical fabrication approach is that it cannot be used early in the development of a new or updated fabrication process. Integrated circuit fabrication vendors are constantly updating their processes or developing new ones, and need to provide designers with corresponding cell libraries as early as possible in order that new or updated designs can take advantage of the process improvements as soon as possible. But at early stages, wafers cannot yet be fabricated reliably or consistently enough to yield useful information about performance variations.

According to an aspect of the invention, in one embodiment, a system calculates the performance of each subject cell in the cell library for a plurality of hypothetical sets of boundary conditions. The system identifies, from the cell layout of a selected cell, the locations of all terminals of all transistors and interconnects in the cell. The system develops a netlist in dependence upon the identified transistors, transistor terminals, and interconnects. For each hypothetical set of boundary conditions, the system also synthesizes, using a fabrication process emulation tool, a 3D representation of the cell fabricated in accordance with the cell layout in the cell library and a fabrication process. The represented device includes both transistors and interconnects, as well as stress profiles as indicated by the hypothetical set of boundary conditions. The system then evaluates the operational characteristics of each transistor in the circuit individually. The operational characteristics of a transistor are transistor-specific behavior that can be described for example by IV curves of the transistor. The operational characteristics can be converted into a set of BSIM parameters that are specific for each transistor depending on its shape (lithographic and etch effects) and stress profile. The netlist, with its transistor-specific BSIM model parameters, then can be used in a circuit simulator such as HSPICE to evaluate the performance of the selected cell given the hypothetical set of boundary conditions by estimating circuit timing, power consumption, among other things.

Evaluation of the 3D model of the cell can be very time consuming, even with powerful modern computer systems. The evaluation of a 3D model of one transistor, to determine the performance variations introduced by only a single set of hypothetical boundary conditions, might require several hours of intensive compute time with advanced software. Each library cell contains anywhere from 2 to 40 or more transistors, which would exponentially increase the time required to perform the analysis. Furthermore, each library may have hundreds of different cells to be evaluated.

Thus in accordance with another aspect of the invention, in an embodiment, after the simulated fabrication of the 3D representation of the selected cell, instead of providing the entire structure to the TCAD tool for analysis and extraction of the transistor-specific BSIM parameters, the system divides up the 3D representation to cut out all the individual transistors into separate simulation domains. Since stress, lithographic, and etch effects deriving from the library cell scale structure are already included, the individual simulation domains can be used to accurately determine the IV curves for each of the transistors. For example, each transistor can be characterized in a 3D drift-diffusion simulator to obtain IV curves, and the transistor-specific IV curves can be converted into BSIM model parameters for that transistor in that cell with the specific hypothetical boundary conditions applied.

One or more embodiments of the invention or elements thereof can be implemented in the form of a computer product including a computer readable storage medium with computer usable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) executing on one or more hardware processors, or (iii) a combination of hardware and software modules; any of (i)-(iii) implement the specific techniques set forth herein, and the software modules are stored in a non-transitory computer readable storage medium (or multiple such media).

These and other features, aspects, and advantages of the invention will become apparent from the following detailed description of illustrative embodiments thereof, which is to be read in connection with the accompanying drawings.

BRIEF DESCRIPTION OF THE DRAWINGS

The invention will be described with respect to specific embodiments thereof, and reference will be made to the drawings, in which:

FIG. 3 illustrates an organization of a cell library database that includes aspects of the invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein. A detailed description of embodiments of the present invention is provided with reference to the FIGS. 1-10.

I. Overall Integrated Circuit Design Flow

Figure 1:
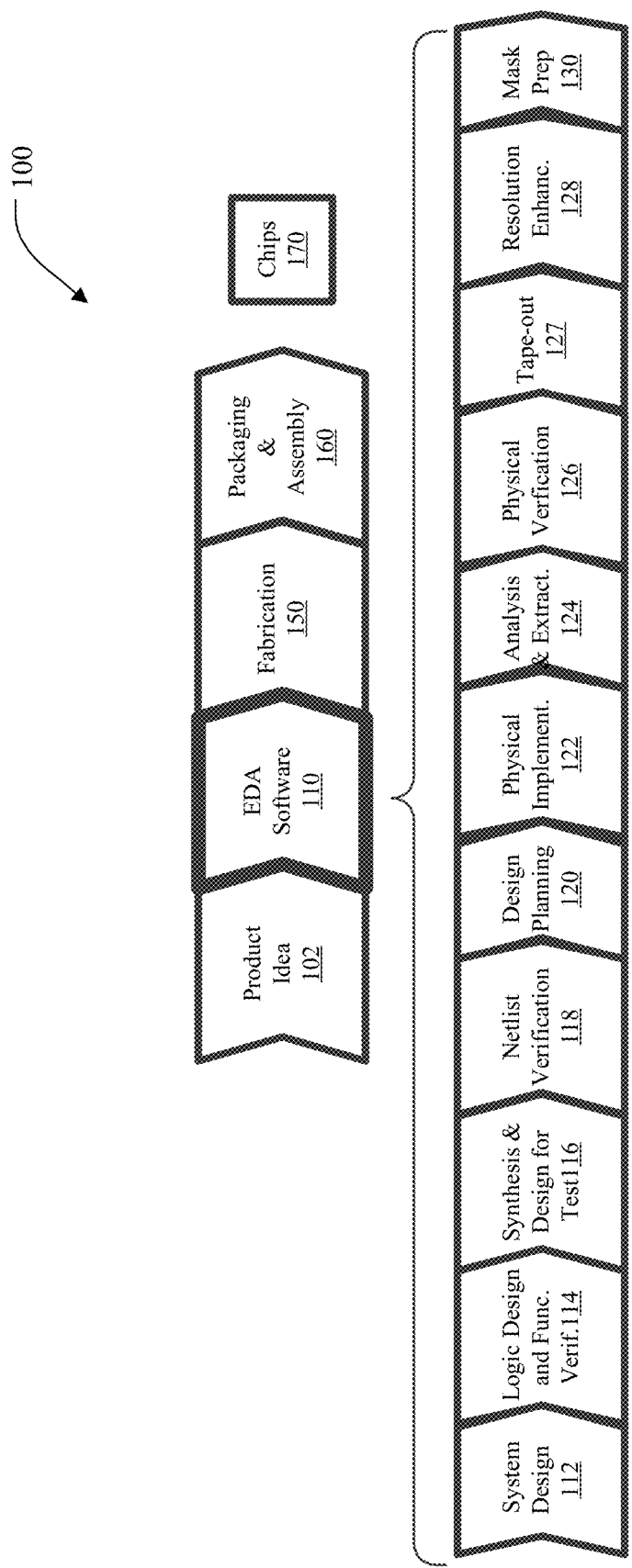
FIG. 1 illustrates EDA tools and design flow for integrated circuit design and manufacturing.

Aspects of the invention can be used to support an integrated circuit design flow. FIG. 1 shows a simplified representation of an illustrative digital integrated circuit design flow. At a high level, the process starts with the product idea (step 102) and is realized in an EDA (Electronic Design Automation) software design process (step 110). When the design is finalized, it can be taped-out (step 127). At some point after tape out, the fabrication process (step 150) and packaging and assembly processes (step 160) occur resulting, ultimately, in finished integrated circuit chips (result 170).

The EDA software design process (step 110) is itself composed of a number of steps 112-130, shown in linear fashion for simplicity. In an actual integrated circuit design process, the particular design might have to go back through steps until certain tests are passed. Similarly, in any actual design process, these steps may occur in different orders and combinations. This description is therefore provided by way of context and general explanation rather than as a specific, or recommended, design flow for a particular integrated circuit.

A brief description of the component steps of the EDA software design process (step 110) will now be provided.

System design (step 112): The designers describe the functionality that they want to implement, they can perform what-if planning to refine functionality, check costs, etc. Hardware-software architecture partitioning can occur at this stage. Example EDA software products from Synopsys, Inc. that can be used at this step include Model Architect, System Studio, and DesignWare® products.

Logic design and functional verification (step 114): At this stage, the VHDL or Verilog code for modules in the system is written, and the design is checked for functional accuracy. More specifically, the design is checked to ensure that it produces correct outputs in response to particular input stimuli. Example EDA software products from Synopsys, Inc. that can be used at this step include VCS, VERA, DesignWare®, Magellan, Formality, ESP and LEDA products.

Synthesis and design for test (step 116): Here, the VHDL/Verilog is translated to a netlist. The netlist can be optimized for the target technology. Additionally, the design and implementation of tests to permit checking of the finished chip occurs. Example EDA software products from Synopsys, Inc. that can be used at this step include Design Compiler®, Physical Compiler, DFT Compiler, Power Compiler, FPGA Compiler, TetraMAX, and DesignWare® products.

Netlist verification (step 118): At this step, the netlist is checked for compliance with timing constraints and for correspondence with the VHDL/Verilog source code. Example EDA software products from Synopsys, Inc. that can be used at this step include Formality, PrimeTime, and VCS products.

Design planning (step 120): Here, an overall floor plan for the chip is constructed and analyzed for timing and top-level routing. Example EDA software products from Synopsys, Inc. that can be used at this step include Astro and Custom Designer products.

Physical implementation (step 122): The placement (positioning of circuit elements) and routing (connection of the same) occurs at this step, as does the selection of a target cell in dependence upon the determined boundary conditions of the neighboring cells and determination of the performance of the target cell based on the boundary conditions imposed on the target cell by the neighboring cells. Example EDA software products from Synopsys, Inc. that can be used at this step include Astro, IC Compiler II, and Custom Designer products. Aspects of the invention can be performed during this step 122.

Analysis and extraction (step 124): At this step, the circuit function is verified at a transistor level, this, in turn, permits what-if refinement. Example EDA software products from Synopsys, Inc. that can be used at this step include AstroRail, PrimeRail, PrimeTime, and Star-RCXT products.

Physical verification (step 126): At this step, various checking functions are performed to ensure correctness for manufacturing, electrical issues, lithographic issues, and circuitry. Example EDA software products from Synopsys, Inc. that can be used at this step include the Hercules product.

Tape-out (step 127): This step provides the "tape out" data to be used (after lithographic enhancements are applied if appropriate) for production of masks for lithographic use to produce finished chips. Example EDA software products from Synopsys, Inc. that can be used at this step include the IC Compiler and Custom Designer families of products.

Resolution enhancement (step 128): This step involves geometric manipulations of the layout to improve manufacturability of the design. Example EDA software products from Synopsys, Inc. that can be used at this step include Proteus, ProteusAF, and PSMGen products.

Mask data preparation (step 130): This step provides mask-making-ready "tape-out" data for production of masks for lithographic use to produce finished chips. Example EDA software products from Synopsys, Inc. that can be used at this step include the CATS(R) family of products. The method for actually making the masks can use any mask making technique, either known today or developed in the future. As an example, masks can be printed using techniques set forth in U.S. Pat. Nos. 6,096,458; 6,057,063; 5,246,800; 5,472,814; and 5,702,847, all incorporated by referenced herein for their teachings of mask printing techniques.

A typical integrated circuit process development flow can include aspects of the invention as described herein. Such a flow typically includes:

(1) Develop individual process steps for manufacturing the integrated circuit. This can be modeled with the Synopsys tools "Sentaurus Process" and "Sentaurus Topography". The input information here includes process conditions like temperature, reactor ambient, implant energy, etc. The output information is the changes in geometry or doping profiles or stress distribution.

(2) Integrate the individual process steps into the complete process flow. This can be modeled with the Synopsys tool "Sentaurus Process". The input information here includes the collection of the process steps in the appropriate sequence. The output includes the geometry, the doping profiles, and the stress distribution for the transistors and the space in between the transistors.

(3) Analyze performance of the transistor manufactured with this process flow. This can be done with the Synopsys tool "Sentaurus Device". The input information here includes the output of step (2) and the biases applied to transistor terminals. The output information includes the currents and capacitances of the transistors for each bias combination.

The output information developed in step (3) characterizes the transistors made using the process, and the characteristics are then provided to circuit simulators such as HSPICE in order to permit a designer to analyze circuit designs at a transistor level. By analyzing the circuit at a transistor level, the designer is able to develop better designs.

If necessary, modify the process steps and the process flow to achieve the desired transistor performance. This can be done iteratively by using the Synopsys tools mentioned above. Cells can be constructed and analyzed as described herein at any iteration in the cycle.

Once the process flow is ready, it can be used for manufacturing multiple circuit designs coming from various designers in various companies. The EDA flow 112-130 will be used by such designers. The process development flow described here can be used for example at a foundry to develop a process flow that can be used to manufacture designs coming from the designers. A combination of the process flow and the masks made from step 130 are used to manufacture any particular circuit.

II. Overview of the Placement and Routing Technique Taking Layout-Dependent Stress Variation into Account As mentioned, part of the usual integrated circuit design flow involves developing a logic design and then synthesizing a circuit design from a logic design. As used herein, a "circuit design" is a transistor level design, after synthesis from VHDL or equivalent and before layout. Additionally, it will be understood that a layout need not be of a complete circuit design, for example, if only a portion of the circuit is to be simulated at this time. A circuit design is laid out using any desired layout software. A "circuit design layout" of a circuit design describes the layout "features," and that will eventually be used to define transistors, interconnects, and other functional and nonfunctional structures that will eventually appear on the integrated circuit device. The "features" include edges, materials, depths, and so on, that are specified by the layout to exist on the final integrated circuit. Two sets of layout features are considered herein to be "different" if they differ in at least one aspect. The circuit design layout can be in any of several formats (e.g., GDSII, OASIS, TIF). Example products available from Synopsys, Inc. that can be used to perform to lay out a circuit design are Astro and CosmosLE.

The logic design in the circuit design expresses the design with reference to the various cell logical functions that are available as cells in the cell library. It is common for IC designers to take advantage of standard cells (also sometimes called macrocells) that have been pre-designed to perform particular logical functions, such as logic gates, registers, larger logic functions, memory and even entire processors or systems. These standard cells are provided in a library available from various sources, such as foundries, ASIC companies, semiconductor companies, third party IC providers, and even EDA companies, and used by designers when designing larger circuits. Each standard cell typically includes such information as a graphical symbol for schematic drawings; text for a hardware description language such as Verilog; a netlist describing the devices in the included circuit, the interconnections among them, and the input and output nodes; cell layout (physical representation) of the circuit in one or more geometry description languages such as GDSII; an abstract of the included geometries for use by place-and-route systems; a design rule check deck; simulation models for use by logic simulators and circuit simulators; and so on. While a "circuit design layout" of a circuit design describes the features that will eventually appear on the integrated circuit device, a "cell layout" of a cell describe features that define transistors, interconnects, and other functional and nonfunctional structures of that particular cell. An IC designer describes a circuit design with a plurality of cells. The corresponding cell layouts of the plurality of cells will be used to lay out the circuit design in the final circuit design layout.

Some libraries may include less information for each cell, and others may include more. In some libraries, the entries are provided in separate files, whereas in others they are combined into a single file, or one file containing the entries for multiple different cells. In all cases, the files are either stored and distributed on a computer readable medium or delivered electronically and stored by the user on a computer readable medium. A "computer readable medium," as the term is used herein, may include more than one physical item, such as more than one disk, or RAM segments or both. Typically the computer readable medium is non-transitory.

Standard cells libraries often contain multiple versions of the same logic function differing in area, speed and/or power consumption, in order to allow designers or automated tools the option to trade off among these characteristics. As used herein, two or more cells are said to have a "common logic function" if they perform the same logical function. For example, for an "inverter" logic function, two different cells might be available which implement different trade-offs between speed and power consumption. A standard cell library can also be thought of as a database of standard cells. As used herein, the term "database" does not necessarily imply any unity of structure. For example, two or more separate databases, when considered together, still constitute a "database" as that term is used herein. As such, the entries defining each single standard cell can also be thought of as a "database." A database can be stored on a hard drive, a storage device or in a memory location or in one or more non-transitory computer readable media. As used herein, no distinction is intended between whether a database is disposed "on" or "in" a computer readable medium.

Figure 2:
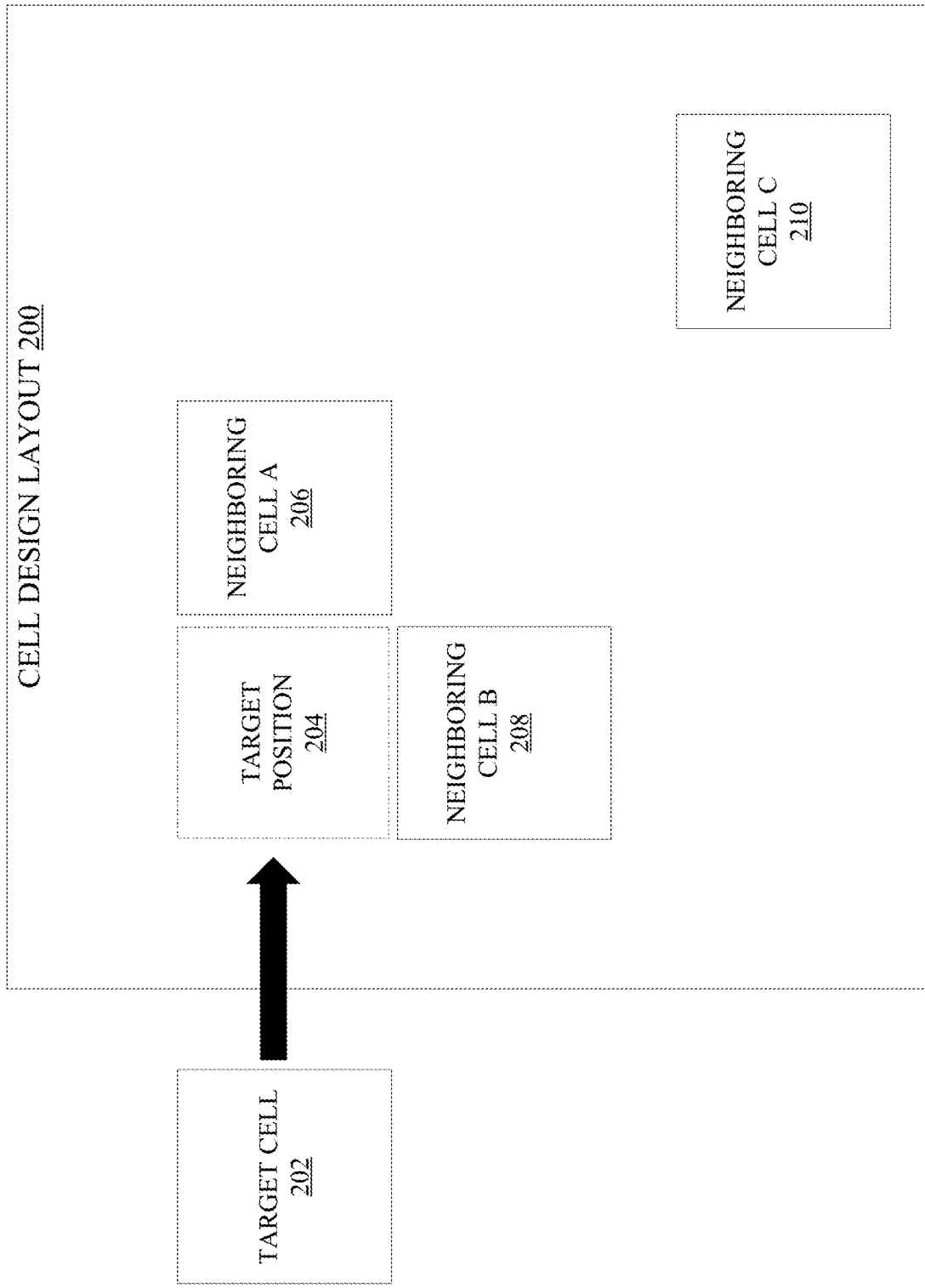
FIG. 2 illustrates a block diagram of an embodiment of a target circuit design layout comprising a target position and a plurality of neighboring cells.

FIG. 2 illustrates a block diagram of an embodiment of a circuit design layout 200 implementing a specified circuit design. The circuit design layout 200 has been partially laid out with neighboring cell A 206, neighboring cell B 208 and neighboring cell C 210. A target cell 202 needs to be placed in the target position 204 in order to further complete the requirement of the specified circuit design. As used herein, a "position" in a circuit design layout is defined by its topology relative to other cells, not necessarily relative to some fixed absolute coordinate system of the IC die. Therefore, during the placement of a cell in a circuit design layout, if a cell is shifted by a few microns, without changing the topology of the cell relative to other cells in the circuit design layout, then the "position" of the cells, as the term is used herein, does not change. The target position 206 is defined relative to cells in the vicinity of the target position. In FIG. 2, neighboring cell A 206 is to the right of target position 204 while the neighboring cell B 208 is below target position 204. A "neighboring cell" relative to a position may not be immediately adjacent to the position, such as neighboring cell C 210 for target position 204.

Referring to FIG. 2, a target cell 204 can be chosen from a standard cell library. However, many of these standard cell libraries do not take into account effects of stress variation inside a cell and effects of unintentional and intentional stress generation mechanisms from neighboring cells. Any stress generation mechanisms present in neighboring cell A 206 and neighboring cell B 208 may cause stress variation in a target cell placed in target position 204. Even though neighboring cell C 210 is not an immediate neighbor of target position 204, neighboring cell C 210 may still cause stress variation in the target cell placed in target position 204. Stress variations imposed by neighboring cells on the target position may hamper the performance of any cell placed in the target position. In turn, degradation of the performance of the cell in the target location can degrade the performance of the entire circuit design. If layout-dependent stress variations are not taken into account during placements of cells in the circuit design layout, the performance and the design rule compliance of an IC can be severely compromised.

Embodiments of the invention address this unpredictability with an improved process of selecting a target cell among the available cells in a cell library to be placed in the circuit design layout at least in part in dependence upon the specified circuit design, the target location of the cell and performance of the cell taking into account the stress variation caused inside the cell by neighboring cells of the target position and stress generation mechanisms inside the cell. In turn, a cell placed in a target position may cause stress variations in neighboring cells, causing performance of one or more of the neighboring cells to change.

Stress contributions from neighboring cells can be represented as stress "boundary conditions" imposed on a cell by neighboring cells. In some embodiments, boundary conditions imposed on a cell may be represented as a set of 2D vectors (a 2D vector in X and Y directions, the X direction is the same as the longitudinal direction, the Y direction is the same as the transverse direction, and the Z direction is perpendicular to both the longitudinal and transverse directions, representing a depth into the integrated circuit chip). Each vector in the set of 2D vectors indicates stress at a given point along the edge of the cell. In some embodiments, boundary conditions imposed on a cell may be represented as a set of 3D vectors (a 3D vector in X, Y and Z directions). In some embodiments, additional columns may be added to the vectors to represent variables other than stress. Boundary conditions may be provided at different levels of granularity in different embodiments, for example anywhere from one point on each of the four sides of a cell to thousands of points or more on each side of the cell.

Stress at each point in the plurality of points along the edge of the cell can be approximated by combining the approximate stress contributions to the stress at the current point, due to the various stress generation mechanisms in a certain search region around the current point. Since stress decays with distance, the search region should be large enough to include stress generation mechanisms outside the cell but should not extend to such a great distance that the stress contribution at the sample point is negligible. As used herein, the "combining" of values means evaluating the values together in a predetermined mathematical function. In the present embodiment, an assumption is made that the stress contributions from all sources and all stress generation mechanisms are additive, and, the system simply sums the approximate stress contributions. U.S. Pat. No. 8,713,510, incorporated by reference herein, describes methodologies to approximate stress at points in the channel of a transistor, and similar techniques can be used to approximate stress for the purposes herein at points on an edge of a macrocell.

FIG. 3 illustrates an organization of a pertinent part of a cell library database 300 that includes aspects of the invention. It can be seen that in this library, cell logic function A (also called functional block A) has four individual standard cells A1, A2, A3, and A4, all of which will perform the logic function A. Similarly, cell function B in FIG. 3 has three standard cells B1, B2, and B3. Multiple cells options are provided for each logic function, because each version makes a different tradeoff between competing objectives that may be of paramount importance for a circuit design or in a particular location of a circuit design.

For each cell option, performance parameters are specified for a plurality of different sets of boundary conditions. In some embodiments, the plurality of sets of boundary conditions are set out individually in the cell description, each set describing a hypothetical set of boundary conditions extant at each of a plurality of points on the edges of the cell. The cell description indicates what the cell's performance parameters would be for each listed hypothetical set of boundary conditions. In another embodiment, the plurality of sets of boundary conditions are defined formulaically for one or more continuous ranges of values The cell description may have one formula to describe what the cell's performance characteristics would be as a function of the boundary condition values in each of the continuous ranges. In yet another embodiment, the plurality of sets of boundary conditions are defined by identifying as neighbors specific other cells from the cell library. The cell description may indicate what the cell's performance parameters would be for each specified neighboring cell. Other embodiments will be apparent to the reader.

In addition, as mentioned previously herein, many kinds of cell boundary conditions can be assumed to be additive at any particular point inside the cell. This is the case for example with stress, etch microloading, visibility for materials deposition, and consumption of chemicals. Thus it is not necessary for a cell description to specify the cell's performance characteristics for all combinations of boundary conditions on all four sides of the cell. It may be sufficient, for example, to specify them for reasonable ranges of boundary conditions separately on the North, South, East and West sides of the cell, it being up to the software to add up the effects of each at any particular point inside the cell.

The library database also includes, for each cell ID, an indication of the boundary conditions that the cell imposes on its own neighboring cells in each of the four directions.

The various performance parameters specified for example may be cell delay, transition time, capacitance, fan-out, cell area, leakage current, and/or power consumption. Performance parameters can be represented in any of a variety of forms in various embodiments. In one embodiment, it is represented as the delay and/or transition time of the cell, in units of time. In another embodiment, it is represented as the power consumption of the cell, in units of Joules. In another embodiment, both the delay and the power consumption of the cell are represented. The availability of multiple cell choices provides the designer (or design software) the ability to trade off one or more of the performance parameters in favor of others for a given cell function, in order to best satisfy the needs of the design.

Part of the process of laying out a circuit design layout from a circuit design involves choosing which of the available standard cells are to be implemented for each instance of the cell logic functions in the circuit design. In one embodiment the instances are considered one at a time, and cells are chosen to optimize for the needs for that instance.

Figure 4:
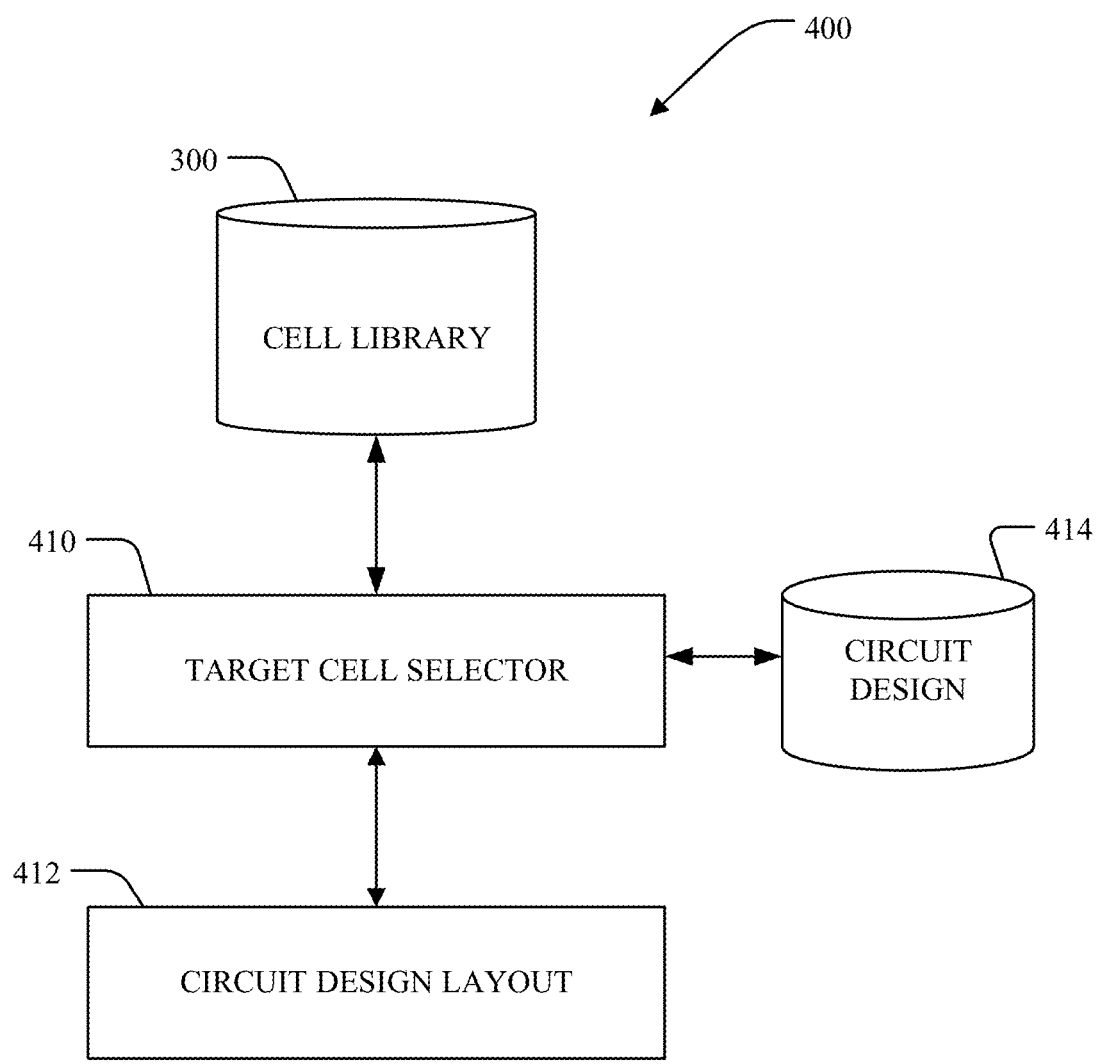
FIG. 4 illustrates a cell placement system in accordance with one embodiment of the present invention.
Figure 5:
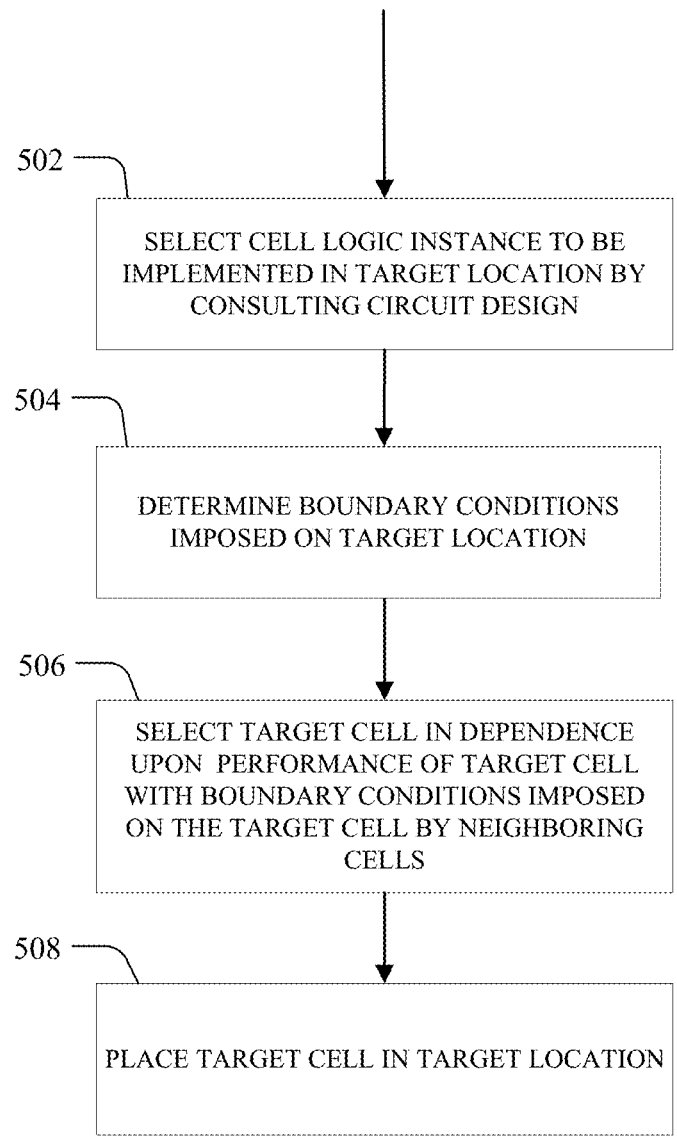
FIG. 5 is a flowchart that illustrates cell placement in a target circuit design layout by the cell placement system in FIG. 4.

FIG. 4 illustrates a cell placement system 400 in accordance with one embodiment of the present invention. The cell placement system 400 includes a cell library 300 such as the one illustrated in FIG. 3, a target cell selector 410, a circuit design 414, and a target cell design layout 412. FIG. 5 is a flowchart that illustrates steps that are performed by the target cell selector 410 of FIG. 4 to select cells from the cell library 300 for placement in the target circuit design layout 412 in accordance to the circuit design 414. The steps shown in FIG. 5 are performed inside a larger loop that chooses, places and routes all the cells for the entire circuit design. Some examples of more complete place-and-route algorithms are set forth for example in U.S. Pat. No. 5,461,576, incorporated by reference herein. As with all flowcharts herein, it will be appreciated that many of the steps can be combined, performed in parallel or performed in a different sequence without affecting the functions achieved. In some cases, as the reader will appreciate, a re-arrangement of steps will achieve the same results only if certain other changes are made as well. In other cases, as the reader will appreciate, a re-arrangement of steps will achieve the same results only if certain conditions are satisfied. Furthermore, it will be appreciated that the flow charts herein show only steps that are pertinent to an understanding of the invention, and it will be understood that numerous additional steps for accomplishing other functions can be performed before, after and between those shown.

In step 502, the cell placement system 400 selects a cell logic function instance to be implemented in a target location in the target circuit design layout 412 by consulting the circuit design 414. In step 504, the cell placement system 400 determines the boundary conditions imposed on the target location by the neighboring cells of the target location. In some embodiments, the system may determine boundary conditions imposed on the target location by one neighboring cell of the target location. In some embodiments, the system may determine boundary conditions imposed on the target location by all neighboring cells of the target location.

In step 506, the cell placement system 400 selects a target cell in dependence upon, among other things, cell logic function to be implemented in the target location (determined in step 502) and the boundary conditions imposed on the target location by neighboring cells (determined in step 504). In one embodiment, the system may select the target cell from the cell library taking into consideration additional factors, such as cell power consumption, size of the cells, routing and interconnect delays, etc.

A plurality of cells is available to be selected for placement in the target location from the cell library 300 such that the selected cell performs the cell logic function needed for the target location. Given the stress boundary conditions imposed on the target location by the neighboring cells of the target location, the performance of each available cell will differ from one another. Among the available plurality of cells, a target cell is chosen for the target location such that it will provide an optimal tradeoff among competing objectives. This selection could include explicit rules, such as selecting the best performing solution or selecting a solution that also meets other specified criteria. In some embodiments, a cost function that quantifies all of the performance parameters will be considered. The cost function will combine the performance parameters in a fashion which weights them according to a predefined set of priorities. For example, the cost function applied can be a weighted sum of delay and power consumption of the candidate solutions. A cost is calculated for each candidate solution, and the one with the lowest (or highest benefit) is selected.

After a target cell is chosen, the target cell is placed in the target location of the circuit design layout 412 at step 508.

In some embodiments, the selected target cell placed in the target location (for example position 204 in FIG. 2) will impose boundary conditions on a neighboring cell (such as neighboring cell A 206 in FIG. 2), such that the performance of the neighboring cell may change. In such cases, the cell placement system 400 may replace the neighboring cell with a different variant which, when placed next to the selected target cell, may better satisfy target criteria for that instance than the original variant of the neighboring cell. It will be appreciated that the new neighboring cell might also in turn impose different boundary conditions on the target cell position 204, as well as on other cells around the neighboring cell 206, and this may require further adjustments and replacements of the cell chosen for target cell 202 as well as certain other nearby cells. The system 400 iterates this problem throughout the entire circuit design (or part of it) until a satisfactory circuit design layout is achieved.

III. Cell Library Preparation with Design Technology Co-Optimization Flow

In order to provide the performance information for use in the above cell selection methods, it is another aspect of the invention to analyze the performance of each library cell in advance, in dependence upon a plurality of sets of boundary conditions that can be imposed on the cell.

Figure 6:
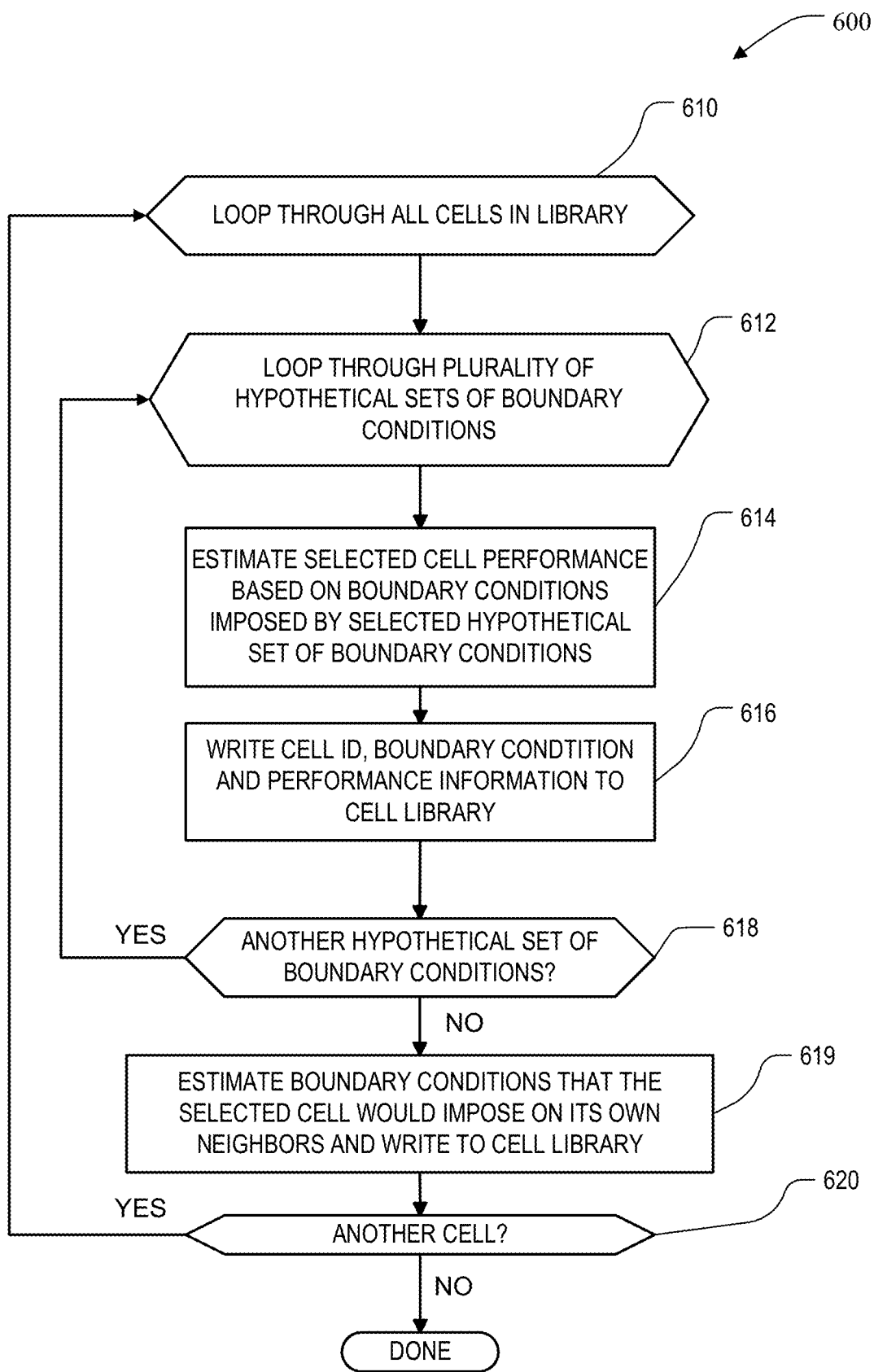
FIG. 6 is a flowchart that illustrates an example method of preparing a cell library in accordance with one embodiment of the present invention.

FIG. 6 is a flowchart 600 illustrating steps that are performed by a computer system in one embodiment to develop cell and performance information.

In step 610, the system begins a loop through all the cells in the library. This includes both sequential and combinatorial cells.

In step 612, the system begins a loop through the plurality of hypothetical sets of boundary conditions that can be imposed on the cell selected in step 610. In some embodiments, the plurality of hypothetical sets of boundary conditions may be a range of boundary conditions.

In step 614, if not already provided in the library, the system performs a simulation to estimate the performance parameters of the selected cell in dependence upon the hypothetical set of boundary conditions selected in step 612.

In step 616, the cell performance parameters estimated in step 614 are written into the cell library database 300. In one embodiment, the database is stored separately from the original library, and in this case, each entry can indicate such information as a cell ID identifying the particular cell which the entry describes, the hypothetical set of boundary conditions selected, and the performance parameters determined in step 614. In another embodiment, the performance parameter is integrated with the original library and stored with the library on the computer readable medium.

In step 618, the system determines whether there are more hypothetical sets of boundary conditions to analyze, and if so, then the system returns to step 612 to analyze the next hypothetical set of boundary conditions. If not, then the system merges the estimated performance of the selected cell resulting from all the hypothetical sets of boundary conditions, into a single identification of the dependency of the performance of the selected cell on the boundary conditions. This merging step will depend on the form in which cell library identifies such dependencies. It may involve mathematical operations, or it may involve simply collecting them individually into a designated space or spaces in the library cell. Also, merging may occur after step 618 or it may occur on-the-fly, as part of step 616 for example. Other variations will be apparent in different embodiments.

In step 619 the system estimates the boundary conditions that the selected cell would impose on its own neighbors, and writes these to the cell library in association with the selected cell. Both sets of analysis can be performed with a TCAD system. In step 620, the system determines whether there are more cells to analyze, and if so, then the system returns to step 610 to analyze the next cell. Whereas the embodiment of FIG. 6 analyzes all cells in the library, it will be appreciated that another embodiment could determine performance parameters for some of the cells. In another embodiment, not all the cells in the library need necessarily be analyzed.

Figure 7:
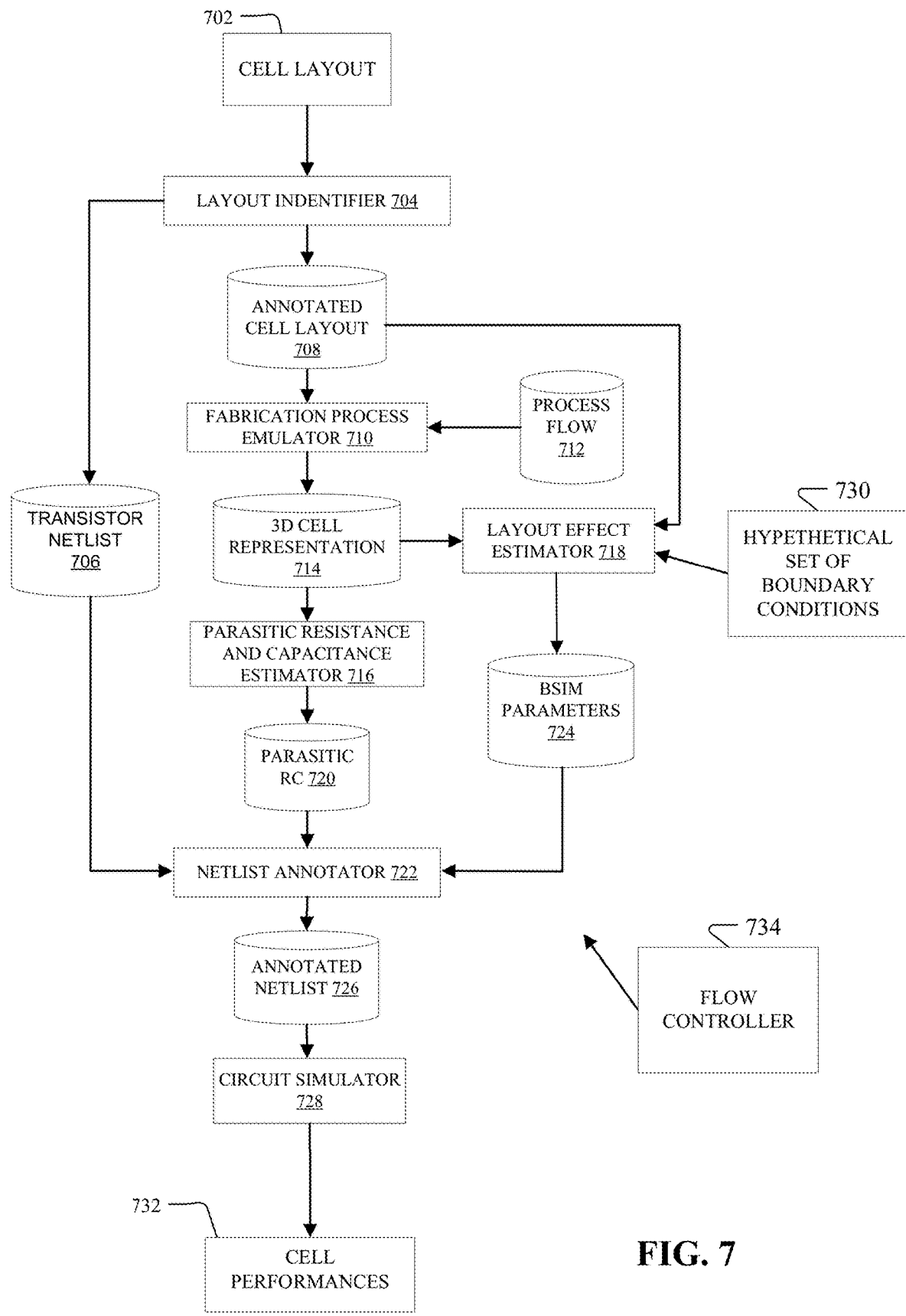
FIG. 7 illustrates design technology co-optimization flow for determining the performance of a cell for a given hypothetical set of boundary conditions imposed on the cell.

FIG. 7 illustrates design technology co-optimization flow for determining the performance of a cell for a given hypothetical set of boundary conditions imposed on the cell (step 614). In aspects of the invention, a Design Technology Co-Optimization (DTCO) flow is used to obtain a performance evaluation of a cell based on its cell layout, a description of a fabrication process under test, and stress and other boundary conditions imposed on the cell. DTCO is a generalized name for a range of techniques that can be performed, usually for the development of a new or improved fabrication process. A goal of a DTCO flow is to enable technology development and design teams to evaluate various transistor and process options using a design technology co-optimization methodology that starts in the pre-wafer research phase. Using techniques described herein, the DTCO flow generates SPICE models from the layout of a cell, taking into account parasitic interconnect resistance and capacitance, and the effect of process variation due to etch microloading, visibility for materials deposition, local consumption of chemicals, photolithography, etching, doping and strain variations in a cell due to various internal and external stress generating mechanisms. The DTCO flow may be utilized to evaluate the performance, power, area, and cost of a new or significantly modified IC fabrication technology. (Henceforth herein both a "new" and a "significantly modified" type of fabrication technology are sometimes referred to simply as a "new" fabrication technology.) Achieving transistor performance and power targets of new IC technology requires consideration of new material options, and sometimes also new device architectures. Parasitic resistance and capacitance of interconnects, and the effect of process variations due to photolithography, etching, doping, and strain are taken into account during the performance evaluation of the new technology.

Referring to FIG. 7, the DTCO flow herein starts with the layout of a cell 702. The cell layout 702 includes at least one electronic device, at least one conductor, and at least one pin. Electronic devices are components for controlling the flow of electrical currents for the purpose of information processing, information storage, and system control. Examples of electronic devices include transistors, diodes, capacitors, and tunnel junctions. Electronic devices are connected to the cell circuit through their terminals, e.g., the gate, source, and drain of a transistor. For simplicity of discussion, the only kind of electronic device discussed in examples herein is a transistor. It will be appreciated that the concepts described herein apply equally well to circuit designs having other types of electronic devices.

Pins in the cell pass signals from and to other cells and power supply lines. Transistors and pins in a cell are connected through metallic conductors referred to herein as interconnects, where the transistor terminals and pins act as the endpoints of interconnects. As used herein, "conductor" is a broader term than "interconnect." A design might include a metal region (conductor) which does not interconnect one terminal or pin to another. The system does not determine parasitic resistance in such a conductor, but they are nevertheless included because they can still affect parasitic capacitance. Also as used herein, an interconnect has one or more "endpoints." Endpoints include terminals of transistors and other electronic devices, as well as "pins," which are endpoints available for further connection to power or other circuit blocks.

Interconnects in an IC can span several layers, each layer separated from the previous layer by a dielectric. Where interconnections are required from one layer to another, an opening is formed through the intervening dielectric layer and filled with a conductive material. There are many variations on this structure. The interconnections between layers sometimes are referred to as 'vias' if they interconnect two metal interconnect layers. The interconnections between layers sometimes are referred to as 'contacts' if they connect the first metal interconnect layer to the silicon or gate layers in transistors. The first layer of metal is referred to herein as "metal 0", or M0 for short. For simplicity of discussion, no distinction is made herein between 'contacts' and 'vias,' and the two terms are used interchangeably herein. During fabrication, the M0 layer is formed over the underlying dielectric and then patterned to form individual conductors. The next dielectric layer is then formed above M0, vias are opened as required in this layer, and then a Metal 1 (M0 layer is formed and patterned. This process continues on up through M3, M4, and so on to the highest metal layer.

As used herein, the term "interconnect" includes at least two endpoints. A conductor with one endpoint may not carry a signal or current from one terminal or pin to another, but it still can affect the overall parasitic capacitance of the cell. In most embodiments, an interconnect has two endpoints, e.g., an interconnect that connects pin VDD to the drain terminal of the P-type transistor in an inverter. In another embodiment, an interconnect can have more than two endpoints (e.g., fan-out, or power distribution).

Referring to FIG. 7, the layout identifier module 704 extracts front end of line (FEOL) structures from the cell layout 702, identifies all the transistor terminals and labels them. It also extracts back end of line (BEOL) structures from higher layers of the layout file, and matches transistor terminals to metal contacts pins. The layout identifier module 704 extracts the pin locations and labels from the cell layout 702. The layout identifier module 704 outputs an annotated cell layout 708 in which all the transistor terminals and pins are labeled. As explained elsewhere herein, the pin and transistor terminal labels and positions can be used to identify the corresponding interconnect endpoints. The layout identifier module 704 also derives a transistor netlist 706 from the same information. In one embodiment the derived transistor netlist 706 lists the transistors only, including channel width and gate length. In another embodiment where FinFETs are included in the circuit design, the number of fins for each FinFET transistor is also included in the transistor netlist 706. A netlist is a text description of connectivity between different components in a cell, such as transistor terminals and pins. The nominal netlist can be in any of several formats (e.g., EDIF, ASCII, RINF, EDIF 2, PADS PCB, Protel, etc.).

Example EDA software products from Synopsys, Inc. that can be used to implement the layout identifier module 704 include "IC WorkBench Edit/View Plus" (ICWBEV+) tool.

The annotated cell layout 708 is provided to a fabrication process emulator 710, which emulates the various fabrication steps of the target process 712 to simulate the fabrication of a device according to the layout 708. The process 712 provides sufficient description of the target fabrication process so that it can be emulated in a simulator. Example EDA software products from Synopsys, Inc. that can be used as the fabrication process emulator 710 include "Sentaurus Process Explorer." In another embodiment, a process emulator with much greater precision can be used, such as Sentaurus Process.

The output of the fabrication process simulator 710 is a representation of the 3-D cell representation 714 of the cell after the fabrication process completes. The 3-D cell representation 714 indicates the surfaces and interfaces among different materials in the structure, and takes account of line edge variation and corner rounding from photolithographic patterning and etching.

The 3-D cell representation 714 is provided to a parasitic resistance and capacitance estimator 716. The parasitic resistance and capacitance estimator 716 may include a field solver that calculates the parasitic resistance and capacitance 720 by simulating current flows through the interconnects endpoints in the 3-D cell representation 714. Example EDA software products from Synopsys, Inc. that can be used for parasitic resistance and capacitance estimator 716 include "Raphael."

The 3-D cell representation 714 is also provided to a layout effect estimator 718. The layout effect estimator 718 characterizes each transistor in the 3-dimensional cell representation 714 in the form of parameters for the Berkeley Short-Channel IGFET (BSIM) models 724. The layout effect estimator 718, which is described in more detail elsewhere herein, takes into account process variations that occur during doping, as well as a hypothetical set of boundary conditions 730 imposed on the cell.

The parasitic resistance and capacitance 720 from the parasitic resistance and capacitance estimator 716 and the BSIM parameters 724 from the layout effect estimator 718 are then provided to a netlist annotator 722. The netlist annotator 722 assembles the resistance and capacitance parasitics 720 and includes it into the transistor netlist 706 to form an annotated netlist 726, which includes realistic values for all RC parasitics. The behavior of each of the transistors in the annotated netlist 726 is described by BSIM parameters 724 that are now specific to each of the transistors. The annotated netlist 726 can be stored on a hard drive, a storage device or in a memory location or in one or more non-transitory computer readable media. The annotated netlist can be in any of several formats (e.g., EDIF, ASCII, RINF, EDIF 2, PADS PCB, Protel, etc.).

The annotated netlist 726 then is applied in a circuit simulator 728 such as HSPICE in order to characterize the cell performance at the level of the full cell. By using transistor operational characteristics simulated for the current hypothetical set of boundary conditions 730, plus realistic values for all RC parasitics in the cell, a realistic set of performance parameters are determined for the current cell specifically under the conditions of the current hypothetical set of boundary conditions 730.

Referring to FIG. 7, the sequence of operation of the layout identifier 704, the fabrication process emulator 710, the parasitic resistance and capacitance estimator 716, the layout effect estimator 718, the netlist annotator 722, and even the circuit simulator 728 can be controlled automatically by a flow controller 734. The flow controller 734 may be a module that executes scripts to call each of the individual processing modules in the sequence set forth in FIG. 7, and defines the data flow among them. The flow controller may be implemented, for example, with Sentaurus Workbench, available from Synopsys, Inc.

Figure 8:
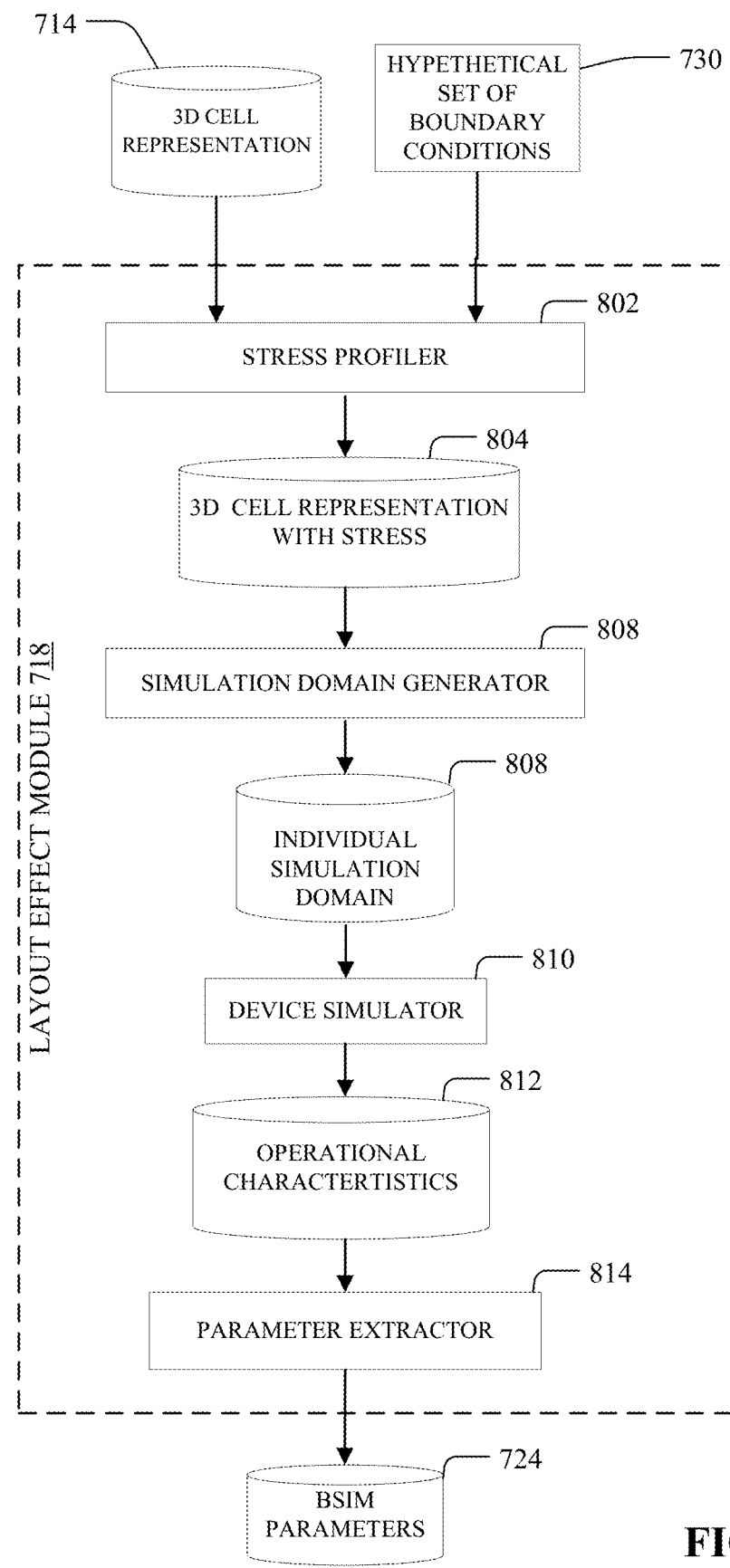
FIG. 8 illustrates the layout effect module of the design technology co-optimization flow in FIG. 7.

FIG. 8 is a flowchart detail of the layout effect estimator 718 of the design technology co-optimization flow in FIG. 7. The 3-D cell representation 714 and the current hypothetical set of boundary conditions 730 are provided to a stress profiler 802 in the layout effect estimator 718. The stress profiler 802 adds mechanical stress analysis 804 to the 3-D cell representation 714. Example EDA software products from Synopsys, Inc. that can be used as a stress profiler 802 includes "Sentaurus Process." The output of the stress profiler 802 includes a representation of the device structure, with a mesh of nodes imposed thereon. Each node includes various detailed information about the volumetric region immediately surrounding the node, including stress variation. In the embodiments described herein, an approximation is made that the stress "in" a node.

Figure 9:
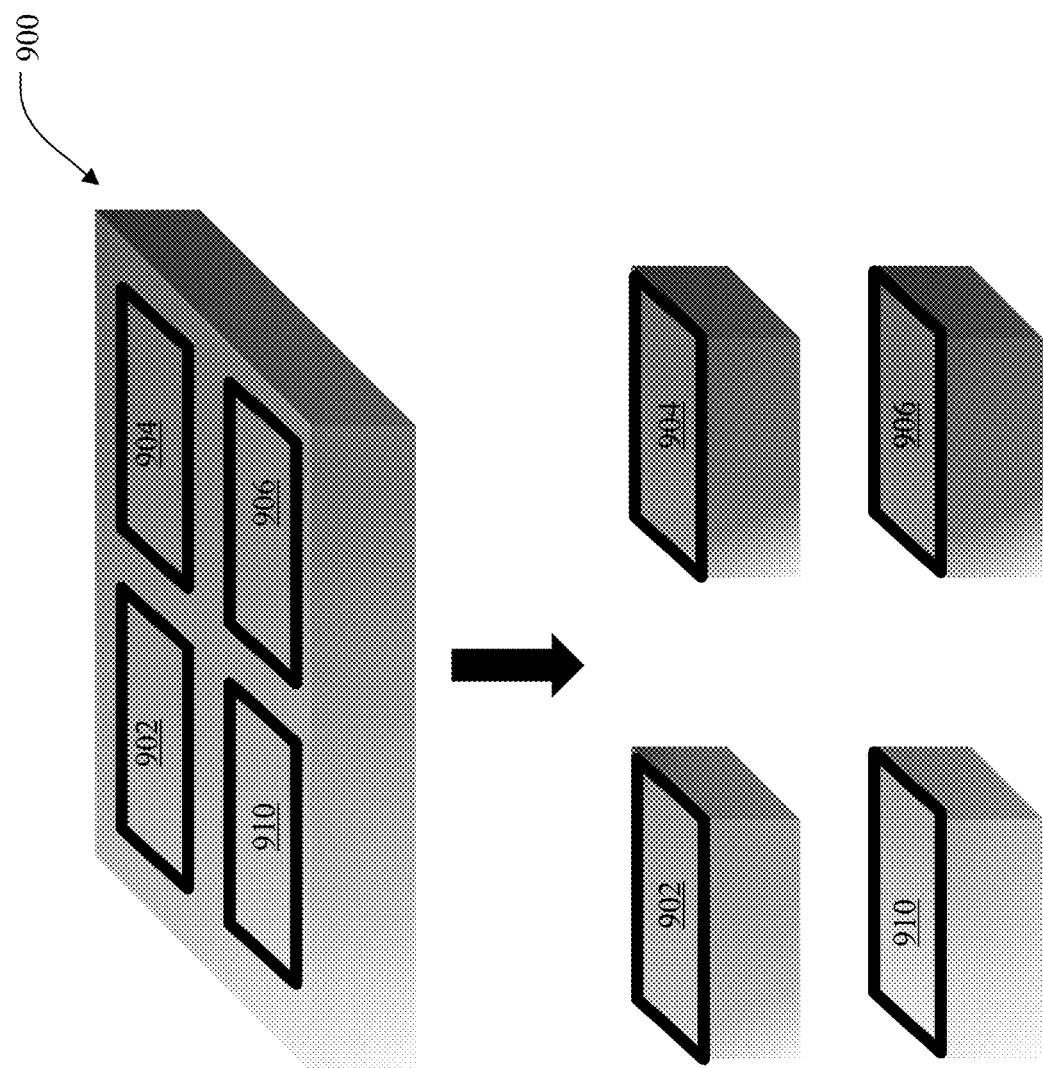
FIG. 9 illustrates the division of a cell into individual simulation domains by the simulation domain generator in FIG. 8.

Individual transistors from the 3-D cell representation 714 with the stress profile 804 are then divided into separate simulation domains 808 (volumetric regions) by the simulation domain generator 806. FIG. 9 illustrates a 3-D cell representation 900 with local stress distribution represented by different shades of gray. The darkest shade represents the highest stressed area in the layout. The lightest shade represents the lowest stressed area in the layout. The 3-D cell representation 900 with four transistors 902, 904, 906 and 908 are divided into four simulation domains, each domain containing only one transistor. Each simulation domain in database 808 contains its individual stress profile, and variations due to photolithography, doping, and micro-loading etching effects.

Each simulation domain in 808 is characterized in a device simulator 810, and operational characteristics of the transistors are saved in database 812. In some embodiment, the "operational characteristics" of a transistor may be the current-voltage characteristics of the transistor. In some embodiment, the "operational characteristics" of a transistor may be the transient characteristics of the transistor. An example EDA software product from Synopsys, Inc. that can be used as device simulator 810 is "Garand." Garand is a 3D drift-diffusion simulator, which can yield highly accurate IV curves at the expense of significant computing time. The division in step 806 of the overall device structure into smaller simulation domains permits the simulations to complete within a reasonable period of time, and they do not lose accuracy because the stress profiles included in the 3D model were generated from the full-size device structure.

The transistor-specific operational characteristics are then converted into BSIM model parameters 714 for each simulation domain 808 by parameter extractor 814. An example EDA software product from Synopsys, Inc. that can be used as the parameter extractor 814 is "Mystic."

Many modifications and variations of the DTCO flow will be apparent to practitioners skilled in this art. In some embodiments, the DTCO flow can be used to evaluate cell performance taking any process variation, such as doping fluctuations, into account. Manufacturing processes have inherent random and systematic variability built into them. Process variation during the fabrication can cause variations in transistor parameters such as threshold voltage, gate length, or channel width, which affect the transistor's drive strength, power consumption, and delay. The impact of process variations increases as the dimensions of the transistor are scaled down. One of the sources of process variations for modern transistors, which can have a gate length less than 20 nm, is random dopant fluctuation. Fewer than 100 dopant atoms are required in the transistor channel with channel length less than 20 nm to achieve a channel dopant concentration of $10^{19}$ atoms/cm$^3$. The displacement or absence of only a few dopants can result in threshold voltage variations. Another source of process variation is photolithographic patterning. Photolithography is used to create patterns on the silicon wafer during the IC chip manufacturing process. The printed patterns are highly sensitive to topographic changes, overlay errors, focus and dose variations, and random particle defects. The edge of a printed patterns exhibits roughness on the scale of 5 nm. This line edge roughness (LER) becomes significant for transistor dimensions with gate length smaller than 50 nm. In addition to LER, a critical dimension can vary due to image effects from corner rounding. Printed patterns with sharp corners exhibit a rounding of the feature at spatial frequencies beyond the resolution of the lithography system, affecting the width of the feature near the corner. Irregularities in transistor features can also be caused by micro-loading effects during etching.

IV. Hardware Implementation

Figure 10:
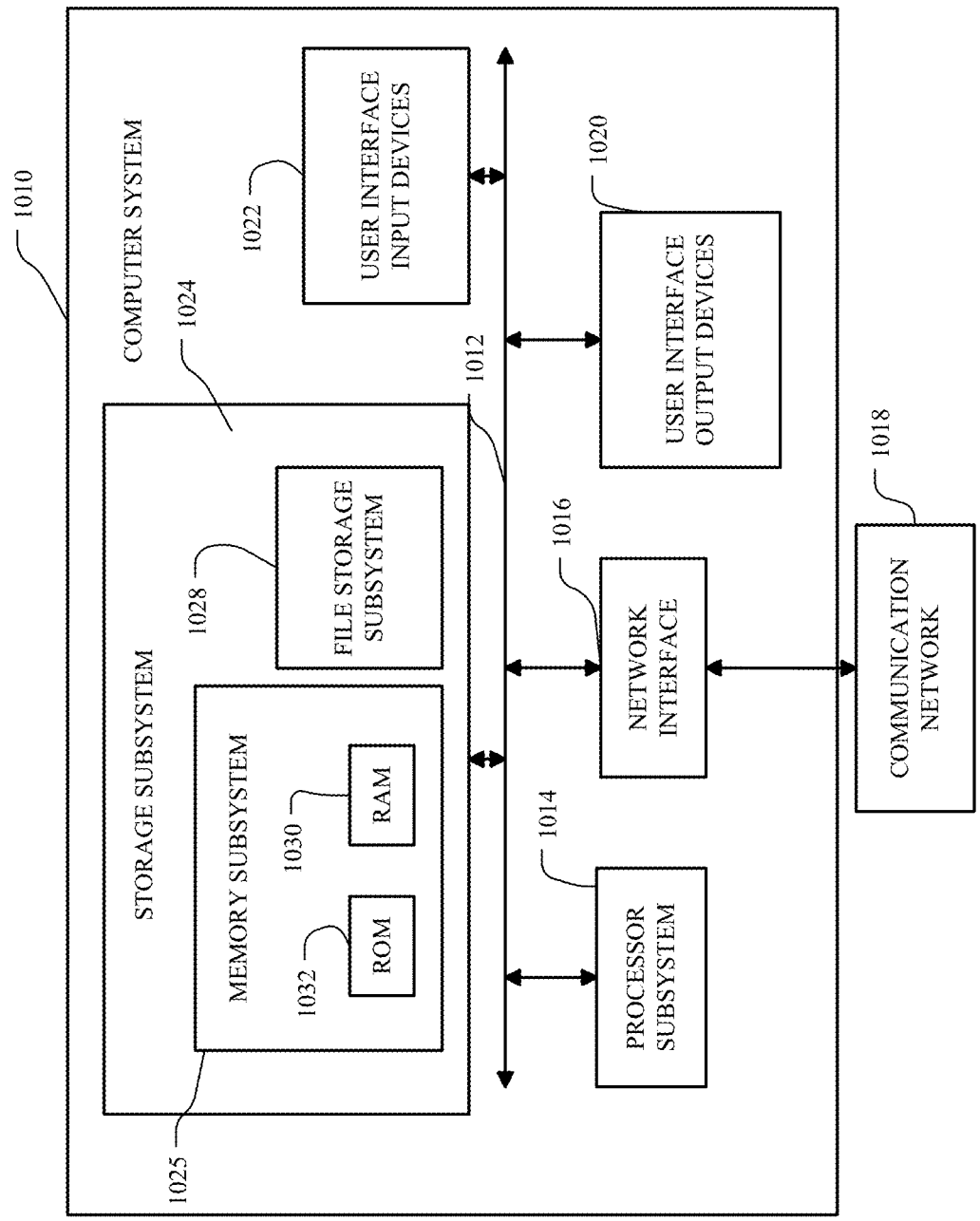
FIG. 10 is a simplified block diagram of an example computer system usable by any of the functional blocks in FIGS. 4, 5, 6, 7 and 8.

FIG. 10 is a simplified block diagram of a computer system 1010 that can be used to implement any of the methods and systems herein. Particularly it can be used to implement the target cell selector 410 of FIG. 4 and/or the DTCO flow in FIG. 7 in various embodiments. It also includes or accesses the cell library database 300.

Computer system 1010 typically includes a processor subsystem 1014 which communicates with a number of peripheral devices via bus subsystem 1012. These peripheral devices may include a storage subsystem 1024, comprising a memory subsystem 1026 and a file storage subsystem 1028, user interface input devices 1022, user interface output devices 1020, and a network interface subsystem 1016. The input and output devices allow user interaction with computer system 1010. Network interface subsystem 1016 provides an interface to outside networks, including an interface to communication network 1018, and is coupled via communication network 1018 to corresponding interface devices in other computer systems. Communication network 1018 may comprise many interconnected computer systems and communication links. These communication links may be wireline links, optical links, wireless links, or any other mechanisms for communication of information, but typically it is an IP-based communication network. While in one embodiment, communication network 1018 is the Internet, in other embodiments, communication network 1018 may be any suitable computer network.

The physical hardware component of network interfaces are sometimes referred to as network interface cards (NICs), although they need not be in the form of cards: for instance they could be in the form of integrated circuits (ICs) and connectors fitted directly onto a motherboard, or in the form of macrocells fabricated on a single integrated circuit chip with other components of the computer system.

User interface input devices 1022 may include a keyboard, pointing devices such as a mouse, trackball, touchpad, or graphics tablet, a scanner, a touch screen incorporated into the display, audio input devices such as voice recognition systems, microphones, and other types of input devices. In general, use of the term "input device" is intended to include all possible types of devices and ways to input information into computer system 1010 or onto computer network 1018.

User interface output devices 1020 may include a display subsystem, a printer, a fax machine, or non-visual displays such as audio output devices. The display subsystem may include a cathode ray tube (CRT), a flat panel device such as a liquid crystal display (LCD), a projection device, or some other mechanism for creating a visible image. The display subsystem may also provide a nonvisual display such as via audio output devices. In general, use of the term "output device" is intended to include all possible types of devices and ways to output information from computer system 1010 to the user or to another machine or computer system.

Storage subsystem 1024 stores the basic programming and data constructs that provide the functionality of certain embodiments of the present invention. For example, the various modules implementing the functionality of certain embodiments of the invention may be stored in storage subsystem 1024. These software modules are generally executed by processor subsystem 1014. The databases 300, 706, 708, 712, 720, 724, 726, 804, 808 and 812 may reside in storage subsystem 1024. Storage subsystem 1024 also represents storage accessible to the computer system on which the various databases mentioned herein are stored. In another embodiment, some or all of the databases are located on storage accessible to the computer system via the network 1018.

Memory subsystem 1026 typically includes a number of memories including a main random access memory (RAM) 1030 for storage of instructions and data during program execution and a read-only memory (ROM) 1032 in which fixed instructions are stored. File storage subsystem 1028 provides persistent storage for program and data files, and may include a hard disk drive, a floppy disk drive along with associated removable media, a CD ROM drive, an optical drive, or removable media cartridges. The databases and modules implementing the functionality of certain embodiments of the invention may have been provided on a computer readable medium such as one or more CD-ROMs, and may be stored by file storage subsystem 1028. For example, each of the databases in FIGS. 3, 4, 7 and 8 may be included in the storage subsystem 1028. The host memory 1026 contains, among other things, computer instructions which, when executed by the processor subsystem 1014, cause the computer system to operate or perform functions as described herein. As used herein, processes and software that are said to run in or on "the host" or "the computer," execute on the processor subsystem 1014 in response to computer instructions and data in the host memory subsystem 1026 including any other local or remote storage for such instructions and data.

Bus subsystem 1012 provides a mechanism for letting the various components and subsystems of computer system 1010 communicate with each other as intended. Although bus subsystem 1012 is shown schematically as a single bus, alternative embodiments of the bus subsystem may use multiple busses.

Computer system 1010 itself can be of varying types including a personal computer, a portable computer, a workstation, a computer terminal, a network computer, a television, a mainframe, a server farm, or any other data processing system or user device. Due to the ever-changing nature of computers and networks, the description of computer system 1010 depicted in FIG. 10 is intended only as a specific example for purposes of illustrating the preferred embodiments of the present invention. Many other configurations of computer system 1010 are possible having more or less components than the computer system depicted in FIG. 10.

In addition, while the present invention has been described in the context of a fully functioning data processing system, those of ordinary skill in the art will appreciate that the databases and processes herein are capable of being distributed in the form of a non-transitory computer readable medium of instructions and data and that the invention applies equally regardless of the particular type of signal bearing media actually used to carry out the distribution. For example, a cell library developed in accordance with techniques described herein can be forwarded to place-and-route equipment (either directly or via a user), which can then use the library to improve the operation of the place-and-route system. As used herein, a computer readable medium is one on which information can be stored and read by a computer system. Examples include a floppy disk, a hard disk drive, a RAM, a CD, a DVD, flash memory, a USB drive, and so on. The computer readable medium may store information in coded formats that are decoded for actual use in a particular data processing system. A single computer readable medium, as the term is used herein, may also include more than one physical item, such as a plurality of CD ROMs or a plurality of segments of RAM, or a combination of several different kinds of media. As used herein, the term does not include mere time varying signals in which the information is encoded in the way the signal varies over time.

As used herein, the "identification" of an item of information does not necessarily require the direct specification of that item of information. Information can be "identified" by referring to the actual information through one or more layers of indirection, or by identifying one or more items of different information which are together sufficient to determine the actual item of information. In addition, the term "indicate" is used herein to mean the same as "identify."

Also as used herein, a given value is "responsive" to a predecessor value if the predecessor value influenced the given value. If there is an intervening processing step, the given value can still be "responsive" to the predecessor value. If the intervening processing step combines more than one value, the output of the processing step is considered "responsive" to each of the value inputs. If the given value is the same as the predecessor value, this is merely a degenerate case in which the given value is still considered to be "responsive" to the predecessor value. "Dependency" of a given value upon another value is defined similarly.

The applicant hereby discloses in isolation each individual feature described herein and any combination of two or more such features, to the extent that such features or combinations are capable of being carried out based on the present specification as a whole in light of the common general knowledge of a person skilled in the art, irrespective of whether such features or combinations of features solve any problems disclosed herein, and without limitation to the scope of any claims that might be included. The applicant indicates that aspects of the present invention may consist of any such feature or combination of features. In view of the foregoing description, it will be evident to a person skilled in the art that various modifications may be made within the scope of the invention.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. In particular, and without limitation, any and all variations described, suggested or incorporated by reference in the Background section of this patent application are specifically incorporated by reference into the description herein of embodiments of the invention. In addition, any and all variations described, suggested or incorporated by reference herein with respect to any one embodiment are also to be considered taught with respect to all other embodiments. The embodiments described herein were chosen and described in order to best explain the principles of the invention and its practical application, thereby enabling others skilled in the art to understand the invention for various embodiments and with various modifications as are suited to the particular use contemplated.

What is claimed is:

1. A method of improving the operation of a place-and-route system in the selection of a target cell in a target circuit design layout for fabrication of an integrated circuit, comprising:
    providing to a computer system a cell library describing a plurality of cells;
    for placement into a target position in the target circuit design layout, a computer system selecting a target cell from the cell library in dependence upon a circuit design, the target position having one or more neighboring cells in the target circuit design layout; and
    placing the target cell into the target position in the target circuit design layout,
    wherein the cell library further indicates, for each cell in the cell library:
        boundary conditions imposed by the cell on neighboring cells in a layout, and
        dependency of performance of the cell on boundary conditions imposed on the cell by neighboring cells in a layout;
    and wherein a computer system selecting the target cell from the cell library comprises:
        a computer system determining from the cell library, boundary conditions imposed on the target position by each of a plurality of cells neighboring the target position in the target circuit design layout; and
        a computer system selecting the target cell further in dependence upon the determined boundary conditions and the dependency, as indicated in the cell library, of performance of the target cell on boundary conditions imposed on the target cell by neighboring cells in a layout.

2. The method of claim 1, wherein the selected target cell imposes boundary conditions on a first neighboring cell of the target position in the target circuit design layout, further comprising a computer system replacing the first neighboring cell with a second neighboring cell in dependence upon the boundary conditions imposed by the target cell on the first neighboring cell.

3. The method of claim 1, wherein a computer system selecting the target cell from the cell library further comprises taking into consideration an additional factor.

4. The method of claim 1, wherein at least two of the cells in the plurality of cells perform a common logic function.

5. The method of claim 1, wherein providing a cell library to a computer system comprises:
    a computer system calculating dependency of performance of each subject cell in the cell library on boundary conditions imposed on the subject cell by neighboring cells in a layout; and
    writing into the cell library in association with the subject cell an indication of the dependency.

6. The method of claim 5, wherein the subject cell includes at least one pin, at least one transistor and at least one conductor, at least one of the conductors being an interconnect, each of the interconnects having at least two endpoints, each of the endpoints being either a terminal of a transistor or a pin,
    and wherein calculating dependency of performance of the subject cell in the cell library on boundary conditions imposed on the subject cell by neighboring cells in a layout comprises:
        synthesizing a three-dimensional cell representation of the subject cell by simulation of a fabrication process, the three-dimensional cell representation including the transistors, pins and interconnects identified for the subject cell;
        for each particular one of a plurality of different hypothetical sets of boundary conditions imposed on the subject cell, estimating, from the three-dimensional cell representation, a performance of the subject cell resulting from the particular hypothetical set of boundary conditions; and
        merging the estimated performance of the subject cell resulting from all the hypothetical sets of boundary conditions in the step of estimating the performance.

7. The method of claim 6, wherein estimating the performance of the subject cell resulting from the particular hypothetical set of boundary conditions comprises:
    identifying, from a subject cell layout of the subject cell in the cell library, locations for each transistor in the subject cell and a plurality of interconnect endpoints in the subject cell;
    estimating, from the three-dimensional cell representation, operational characteristics of each of the transistors in the subject cell resulting from the particular hypothetical set of boundary conditions imposed on the subject cell;
    developing an annotated netlist that includes each transistor in the subject cell identified from the subject cell layout, and each of the interconnects identified from the subject cell layout, and which further indicates the operational characteristics of each of the transistors in the subject cell resulting from the particular hypothetical set of boundary conditions imposed on the subject cell; and applying the annotated netlist in a circuit simulator.

8. The method of claim 7, wherein estimating, from the three-dimensional cell representation, the operational characteristics of each of the transistors in the subject cell resulting from the particular hypothetical set of boundary conditions imposed on the subject cell comprises:
calculating a stress profile the three-dimensional cell representation of the subject cell in at least two dimensions with the particular hypothetical set of boundary conditions imposed on the subject cell acting as boundary conditions of the stress profile;
dividing the three-dimensional cell representation into a plurality of three-dimensional simulation domains, each including one of the transistors of the three-dimensional cell representation and a domain-specific stress profile; and
estimating the operational characteristics of each given one of the transistors in the subject cell resulting from the domain-specific stress profile in the simulation domain that includes the given transistor.

9. The method of claim 8, wherein estimating the operational characteristics of the given transistor comprises:
determining, from the domain-specific stress profile, stress components at at least one point in a channel of the given transistor; and
estimating the operational characteristics of the given transistor in dependence upon the stress components determined for the channel of the given transistor.

10. The method of claim 7 further comprising:
a computer system estimating, from the three-dimensional cell representation, parasitic resistance values between at least one pair of the interconnect endpoints which share an interconnect;
a computer system estimating, from the three-dimensional cell representation, parasitic capacitance values between at least one pair of the interconnect endpoints which are pins of the circuit design; and
a computer system adding to the annotated netlist the parasitic resistance values and parasitic capacitance values estimated from the three-dimensional cell representation.

11. The method of claim 7, wherein applying the annotated netlist in a circuit simulator to evaluate the performance of the cell comprises estimating a circuit timing of the cell.

12. The method of claim 7, wherein applying the annotated netlist in a circuit simulator to evaluate the performance of the cell comprises estimating power consumed by the cell.

13. The method of claim 7, further comprising, estimating, from the three-dimensional cell representation, operational characteristics of every transistor in the three-dimensional cell representation.

14. The method of claim 7, wherein estimating the operational characteristics of each of the transistors in the subject cell resulting from the particular hypothetical set of boundary conditions imposed on the subject cell comprises:
estimating current-voltage characteristics of each given one of the transistors resulting from the particular hypothetical set of boundary conditions imposed on the subject cell; and
converting the current-voltage characteristics of each given transistor into a respective set of model parameters for a transistor model.

15. The method of claim 14, wherein the transistor model is a Berkeley Short-channel Insulated-gate field-effect transistor Model (BSIM).

16. A system for improving the operation of a place-and-route equipment in the selection of a target cell in a target circuit design layout for fabrication of an integrated circuit, the system comprising a memory and a data processor coupled to the memory, the data processor configured to:
provide to a computer system a cell library describing a plurality of cells;
for placement into a target position in the target circuit design layout, select a target cell from the cell library in dependence upon a circuit design, the target position having one or more neighboring cells in the target circuit design layout; and
place the target cell into the target position in the target circuit design layout,
wherein the cell library further indicates, for each cell in the cell library:
boundary conditions imposed by the cell on neighboring cells in a layout, and
dependency of performance of the cell on boundary conditions imposed on the cell by neighboring cells in a layout;
and wherein in selecting the target cell from the cell library the data processor is configured to:
determine from the cell library, boundary conditions imposed on the target position by each of a plurality of cells neighboring the target position in the target circuit design layout; and
select the target cell further in dependence upon the determined boundary conditions and the dependency, as indicated in the cell library, of performance of the target cell on boundary conditions imposed on the target cell by neighboring cells in a layout.

17. The system of claim 16, wherein the selected target cell imposes boundary conditions on a first neighboring cell of the target position in the target circuit design layout,
and wherein the data processor is further configured to replace the first neighboring cell with a second neighboring cell in dependence upon the boundary conditions imposed by the target cell on the first neighboring cell.

18. The system of claim 16, wherein in selecting the target cell from the cell library, the system further takes an additional factor into consideration.

19. The system of claim 16, wherein at least two of the cells in the plurality of cells perform a common logic function.

20. The system of claim 16, wherein in providing a cell library, the system:
calculates dependency of performance of each subject cell in the cell library on boundary conditions imposed on the subject cell by neighboring cells in a layout; and
writes into the cell library in association with the subject cell an indication of the dependency.

21. The system of claim 20, wherein the subject cell includes at least one pin, at least one transistor and at least one conductor, at least one of the conductors being an interconnect, each of the interconnects having at least two endpoints, each of the endpoints being either a terminal of a transistor or a pin,
and wherein in calculating dependency of performance of the subject cell in the cell library on boundary conditions imposed on the subject cell by neighboring cells in a layout, the system:
synthesizes a three-dimensional cell representation of the subject cell by simulation of a fabrication process, the three-dimensional cell representation including the transistors, pins and interconnects identified for the subject cell;

for each particular one of a plurality of different hypothetical sets of boundary conditions imposed on the subject cell, estimates, from the three-dimensional cell representation, a performance of the subject cell resulting from the particular hypothetical set of boundary conditions; and merges the estimated performance of the subject cell resulting from all the hypothetical sets of boundary conditions in the step of estimating the performance.

22. The system of claim 21, wherein in estimating the performance of the subject cell resulting from the particular hypothetical set of boundary conditions, the system:

identifies, from a subject cell layout of the subject cell in the cell library, locations for each transistor in the subject cell and a plurality of interconnect endpoints in the subject cell;

estimates, from the three-dimensional cell representation, operational characteristics of each of the transistors in the subject cell resulting from the particular hypothetical set of boundary conditions imposed on the subject cell;

develops an annotated netlist that includes each transistor in the subject cell identified from the subject cell layout, and each of the interconnects identified from the subject cell layout, and which further indicates the operational characteristics of each of the transistors in the subject cell resulting from the particular hypothetical set of boundary conditions imposed on the subject cell; and applies the annotated netlist in a circuit simulator.

23. The system of claim 22, wherein in estimating, from the three-dimensional cell representation, the operational characteristics of each of the transistors in the subject cell resulting from the particular hypothetical set of boundary conditions imposed on the subject cell, the system:

calculates a stress profile the three-dimensional cell representation of the subject cell in at least two dimensions with the particular hypothetical set of boundary conditions imposed on the subject cell acting as boundary conditions of the stress profile;

divides the three-dimensional cell representation into a plurality of three-dimensional simulation domains, each including one of the transistors of the three-dimensional cell representation and a domain-specific stress profile; and estimates the operational characteristics of each given one of the transistors in the subject cell resulting from the domain-specific stress profile in the simulation domain that includes the given transistor.

24. The system of claim 23, wherein in estimating the operational characteristics of the given transistor, the system:

determines, from the domain-specific stress profile, stress components at least one point in a channel of the given transistor; and estimates the operational characteristics of the given transistor in dependence upon the stress components determined for the channel of the given transistor.

25. The system of claim 22, wherein in estimating the performance of the subject cell resulting from the particular hypothetical set of boundary conditions, the system further:

estimates, from the three-dimensional cell representation, parasitic resistance values between at least one pair of the interconnect endpoints which share an interconnect;

estimates, from the three-dimensional cell representation, parasitic capacitance values between at least one pair of the interconnect endpoints which are pins of the circuit design; and adds to the annotated netlist the parasitic resistance values and parasitic capacitance values estimated from the three-dimensional cell representation.

26. The system of claim 22, wherein the evaluation of the performance of the cell comprises estimating a circuit timing of the cell.

27. The system of claim 22, wherein the evaluation of the performance of the cell comprises estimating power consumed by the cell.

28. The system of claim 22, wherein the system estimates, from the three-dimensional cell representation, operational characteristics of every transistor in the three-dimensional cell representation.

29. The system of claim 22, wherein in estimating the operational characteristics of each of the transistors in the subject cell resulting from the particular hypothetical set of boundary conditions imposed on the subject cell, the system:

estimates current-voltage characteristics of each given one of the transistors resulting from the particular hypothetical set of boundary conditions imposed on the subject cell; and converts the current-voltage characteristics of each given transistor into a respective set of model parameters for a transistor model.

30. The system of claim 29, wherein the transistor model is a Berkeley Short-channel Insulated-gate field-effect transistor Model (BSIM).

31. A non-transitory computer readable medium, for use with a cell library describing a plurality of cells, which indicates, for each cell in the cell library:

boundary conditions imposed by the cell on neighboring cells in a layout; and dependency of performance of the cell on boundary conditions imposed on the cell by neighboring cells in a layout, the computer readable medium having stored thereon a plurality of instructions which when executed by a processor cause the processor to:

select, for placement into a target position in the target circuit design layout, a target cell from the cell library in dependence upon a circuit design, the target position having one or more neighboring cells in the target circuit design layout; and place the target cell into the target position in the target circuit design layout, wherein in selecting the target cell from the cell library the processor:

determines from the cell library, boundary conditions imposed on the target position by each of a plurality of cells neighboring the target position in the target circuit design layout; and selects the target cell further in dependence upon the determined boundary conditions and the dependency, as indicated in the cell library, of performance of the target cell on boundary conditions imposed on the target cell by neighboring cells in a layout.

32. The non-transitory computer readable medium of claim 31, wherein the selected target cell imposes boundary conditions on a first neighboring cell of the target position in the target circuit design layout, and wherein the plurality of instructions further cause the processor to replace the first neighboring cell with a second neighboring cell in dependence upon the boundary conditions imposed by the target cell on the first neighboring cell.

33. The non-transitory computer readable medium of claim 31, wherein selecting the target cell from the cell library further takes into consideration an additional factor.

34. The non-transitory computer readable medium of claim 31, wherein at least two of the cells in the plurality of cells perform a common logic function.

* * * * *